US010113922B2

(12) United States Patent
Ting et al.

(10) Patent No.: US 10,113,922 B2
(45) Date of Patent: Oct. 30, 2018

(54) ELECTRONIC DEVICE AND TRIPLE-AXIAL FORCE MEASUREMENT SENSOR THEREOF

(71) Applicant: Chung-Yuan Christian University, Tao Yuan County (TW)

(72) Inventors: Yung Ting, Tao Yuan County (TW); Sheuan-Perng Lin, Tao Yuan County (TW); Jia-Ci Chen, Tao Yuan County (TW); Suprapto, Tao Yuan County (TW)

(73) Assignee: Chung-Yuan Christian University, Chung Li, Tao Yuan County (TW)

( * ) Notice: Subject to any disclaimer, the term of this patent is extended or adjusted under 35 U.S.C. 154(b) by 141 days.

(21) Appl. No.: 15/428,663

(22) Filed: Feb. 9, 2017

(65) Prior Publication Data

US 2018/0136771 A1 May 17, 2018

(30) Foreign Application Priority Data

Nov. 15, 2016 (TW) .............................. 105137328 A (51) Int. Cl.
 *G01L 1/16* (2006.01)
(52) U.S. Cl.
 CPC ...................................... *G01L 1/16* (2013.01)
(58) Field of Classification Search
 None
 See application file for complete search history.

(56) References Cited

U.S. PATENT DOCUMENTS

| 5,765,046 A | * | 6/1998 | Watanabe | .......... | G01C 19/5642 |
| | | | | | 310/348 |
| 2010/0126270 A1 | * | 5/2010 | Terada | ............... | G01C 19/5719 |
| | | | | | 73/504.12 |
| 2013/0106248 A1 | * | 5/2013 | Burak | .................... | H03H 9/173 |
| | | | | | 310/360 |
| 2013/0160567 A1 | * | 6/2013 | Ota | .......................... | G01L 1/18 |
| | | | | | 73/862.68 |
| 2013/0235001 A1 | * | 9/2013 | Yun | ......................... | H03H 3/02 |
| | | | | | 345/204 |
| 2014/0137398 A1 | * | 5/2014 | Wei | ...................... | H04R 23/002 |
| | | | | | 29/594 |
| 2018/0078970 A1 | * | 3/2018 | Ono | ..................... | A61B 8/4272 |

FOREIGN PATENT DOCUMENTS

| CN | 100549689 C | 10/2009 |
| CN | 102980691 A | 3/2013 |

\* cited by examiner

*Primary Examiner* — Andre Allen
(74) *Attorney, Agent, or Firm* — Muncy, Geissler, Olds & Lowe, P.C.

(57) ABSTRACT

A triple-axial force measurement sensor is disclosed in the invention. The triple-axial force measurement sensor includes a first sensing unit and a second sensing unit. The first sensing unit includes a first electrode, a plurality of second electrodes and a plurality of third electrodes. The first electrode includes an electrode main body, a plurality of first extension columns, a plurality of second extension columns, a plurality of first electrode columns and a plurality of second electrode columns. The first extension columns and the second extension columns are connected to the electrode main body. The first electrode columns are connected to the first extension columns. The second electrode columns are connected to the second extension columns.

20 Claims, 6 Drawing Sheets

ELECTRONIC DEVICE AND TRIPLE-AXIAL FORCE MEASUREMENT SENSOR THEREOF

BACKGROUND OF THE INVENTION

1. Field of the Invention

The present invention relates to a triple-axial force measurement sensor; more particularly, the present invention relates to a triple-axial force measurement sensor which enhances the sensing effect along the directions of the X axis and Y axis.

2. Description of the Related Art

The piezoelectric effect uses material deformation to convert mechanical energy to electricity, or to convert electricity to mechanical energy. In 1942, the piezoelectric feature of $BaTiO_3$ was discovered, and the research and applications of piezoelectric materials have been continuously developed. For example, a piezoelectric material (such as polyvinylidene Difluoride, PVDF) can be used to produce a flat piezoelectric film and to form a sensor.

The piezoelectric material has the features of small size, fast response speed and low displacement power consumption; however, its applications are still limited. For example, if a worker uses polyvinylidene difluoride as a material to produce a flat piezoelectric film for sensing stress on the X axis, Y axis and Z axis, the piezoelectric film can have a great sensing ability on the Z axis (which is the sensing ability of the normal line of the piezoelectric film plane), but sensing abilities of the piezoelectric film on the X axis and Y axis (which are the sensing abilities of the horizontal direction of the piezoelectric film plane) are poor; actual experiments have shown that the sensing abilities of polyvinylidene difluoride flat piezoelectric film on the X axis and Y axis are less than half of the sensing ability on the Z axis. Because the sensing abilities of the three axes of the flat piezoelectric film of the prior art are not uniform, the flat piezoelectric film cannot sense the changes in the stress of the surrounding environment completely.

Therefore, there is a need to provide a new triple-axial force measurement sensor which enhances the sensing effect along the directions of the X axis and Y axis.

SUMMARY OF THE INVENTION

It is an object of the present invention to provide a triple-axial force measurement sensor which enhances the sensing effect along the directions of the X axis and Y axis.

To achieve the abovementioned object, the triple-axial force measurement sensor of the present invention includes a first sensing unit and a second sensing unit. The first sensing unit includes a first electrode, a plurality of second electrodes and a plurality of third electrodes. The first electrode includes an electrode main body, a plurality of first extension columns, a plurality of second extension columns, a plurality of first electrode columns and a plurality of second electrode columns. The plurality of first extension columns and the plurality of second extension columns are connected to the electrode main body. The plurality of first electrode columns are connected to the plurality of first extension columns, wherein a plurality of first containing spaces are formed between any two neighboring first electrode columns, and formed between any one first electrode column and an adjacent electrode main body. A plurality of second electrode columns are connected to the plurality of second extension columns, wherein a plurality of second containing spaces are formed between any two neighboring second electrode columns, and formed between any one second electrode column and an adjacent electrode main body. Each second electrode includes a third extension column and a plurality of third electrode columns. The plurality of third electrode columns are connected to the third extension column, wherein the plurality of third electrode columns are respectively located in each first containing space. Each third electrode includes a fourth extension column and a plurality of fourth electrode columns. The plurality of fourth electrode columns are connected to the fourth extension column, wherein the plurality of fourth electrode columns are respectively located in each second containing space. The second sensing unit is located under the first sensing unit.

According to one embodiment of the present invention, the plurality of third electrode columns are respectively corresponded to the plurality of surrounding first electrode columns and the electrode main body to form a polarization direction along the X axis; the plurality of fourth electrode columns are respectively corresponded to the plurality of surrounding second electrode columns and the electrode main body to form a polarization direction along the Y axis.

According to one embodiment of the present invention, the electrode main body is corresponded to the second sensing unit to form a polarization direction along the Z axis.

According to one embodiment of the present invention, when the first sensing unit is deformed by an external force, the first sensing unit will transfer an electronic signal which is generated due to the deformation of the first sensing unit.

According to one embodiment of the present invention, the plurality of first electrode columns and the plurality of third electrode columns are parallel to each other.

According to one embodiment of the present invention, the plurality of second electrode columns and the plurality of fourth electrode columns are parallel to each other.

According to one embodiment of the present invention, the plurality of first electrode columns are vertically connected to the plurality of first extension columns, and the plurality of third electrode columns are vertically connected to the third extension column of the plurality of second electrodes.

According to one embodiment of the present invention, the plurality of second electrode columns are vertically connected to the plurality of second extension columns, and the plurality of fourth electrode columns are vertically connected to the fourth extension column of the plurality of third electrodes.

According to one embodiment of the present invention, the triple-axial force measurement sensor further includes an electrode column, and the electrode column is connected to the second sensing unit.

According to one embodiment of the present invention, the triple-axial force measurement sensor further includes a first protection board and a second protection board. The first sensing unit and the second sensing unit are located between the first protection board and the second protection board.

Another object of the present invention is to provide an electronic device which enhances the sensing effect along the directions of the X axis and Y axis.

To achieve the abovementioned object, the electronic device of the present invention includes a processor, a power unit and a triple-axial force measurement sensor. The power unit is electrically connected to the processor. The triple-axial force measurement sensor is electrically connected to the processor. The triple-axial force measurement sensor includes a first sensing unit and a second sensing unit. The first sensing unit includes a first electrode, a plurality of second electrodes and a plurality of third electrodes. The first electrode is electrically connected to the processor. The first electrode includes an electrode main body, a plurality of first extension columns, a plurality of second extension columns, a plurality of first electrode columns and a plurality of second electrode columns. The plurality of first extension columns and the plurality of second extension columns are connected to the electrode main body. The plurality of first electrode columns are connected to the plurality of first extension columns, wherein a plurality of first containing spaces are formed between any two neighboring first electrode columns, and formed between any one first electrode column and an adjacent electrode main body. The plurality of second electrode columns are connected to the plurality of second extension columns, wherein a plurality of second containing spaces are formed between any two neighboring second electrode columns, and formed between any one second electrode column and an adjacent electrode main body. Each second electrode is electrically connected to the processor, and each second electrode includes a third extension column and a plurality of third electrode columns. The plurality of third electrode columns are connected to the plurality of third extension columns, and the plurality of third electrode columns are respectively located in each first containing space. Each third electrode is electrically connected to the processor, and each third electrode includes a fourth extension column and a plurality of fourth electrode columns. The plurality of fourth electrode columns are connected to the fourth extension column, and the plurality of fourth electrode columns are respectively located in each second containing space. The second sensing unit is located under the first sensing unit.

DETAILED DESCRIPTION OF THE PREFERRED EMBODIMENT

Figure 1:
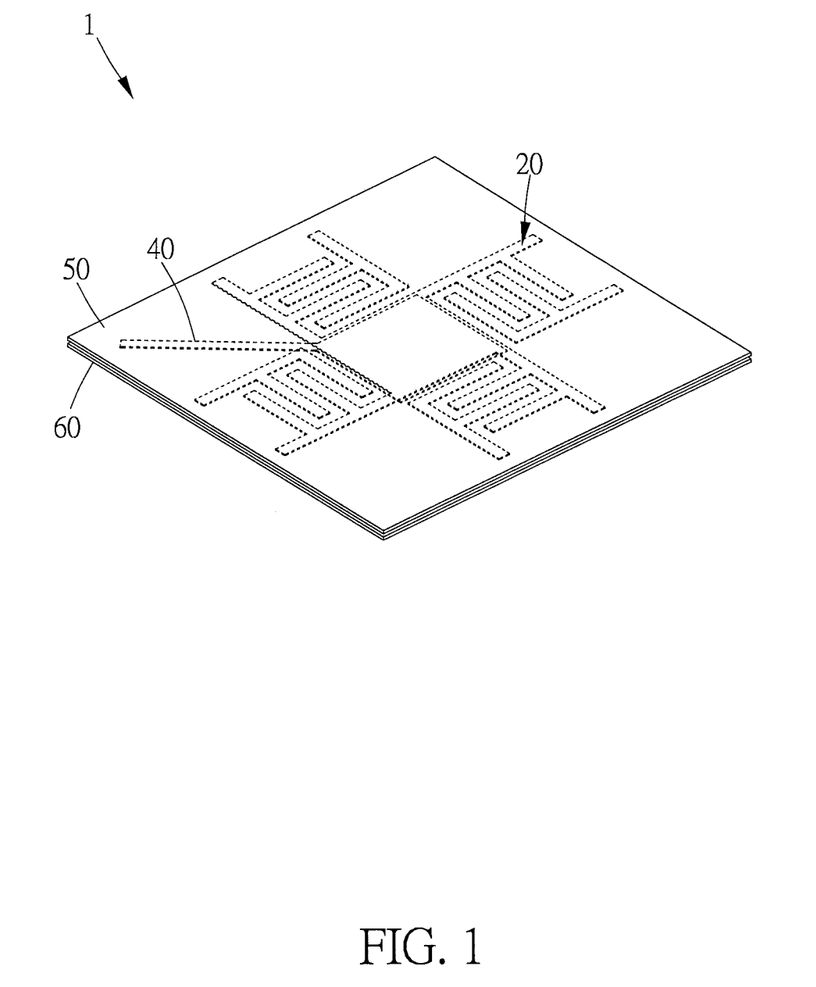
FIG. 1 illustrates a schematic drawing of the triple-axial force measurement sensor in one embodiment of the present invention.
Figure 2:
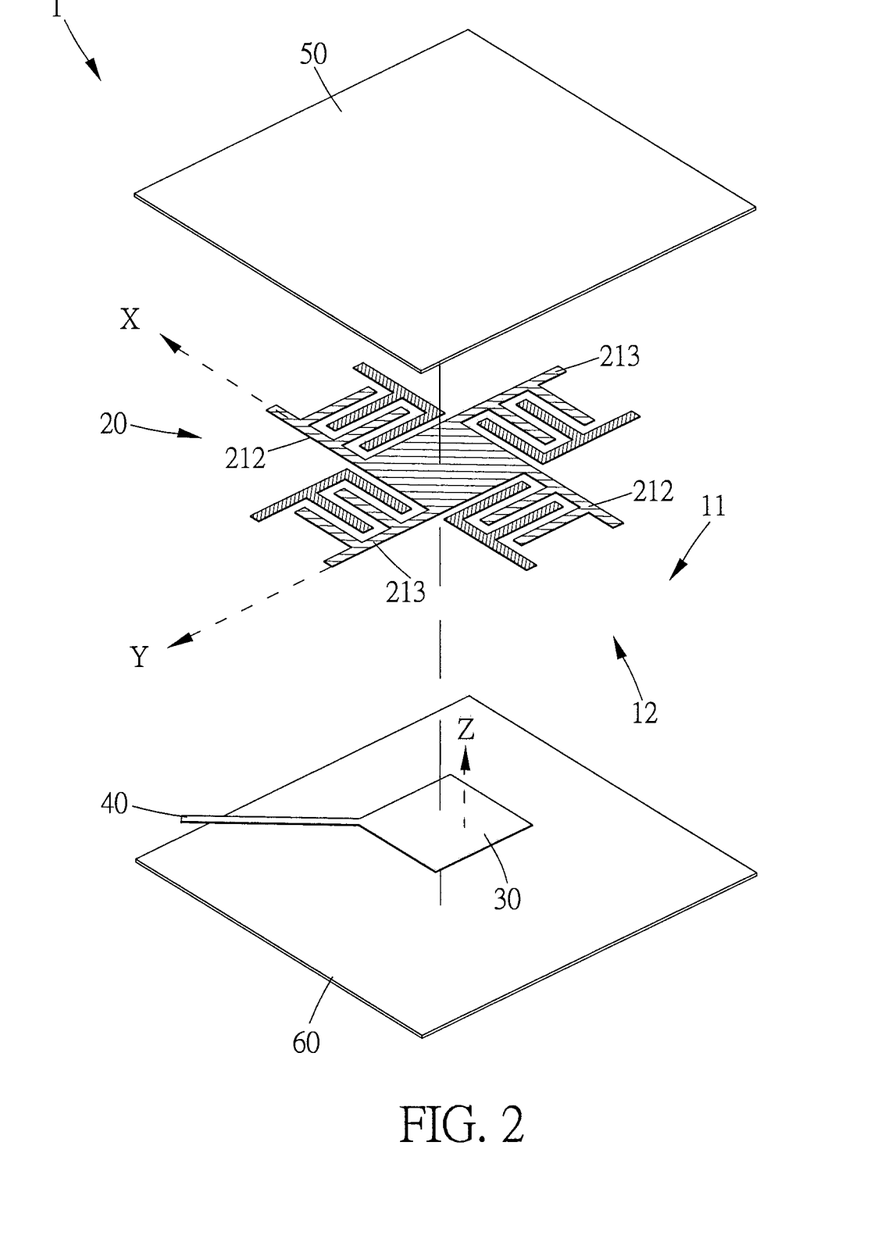
FIG. 2 illustrates an exploded drawing of the triple-axial force measurement sensor in one embodiment of the present invention.
Figure 3:
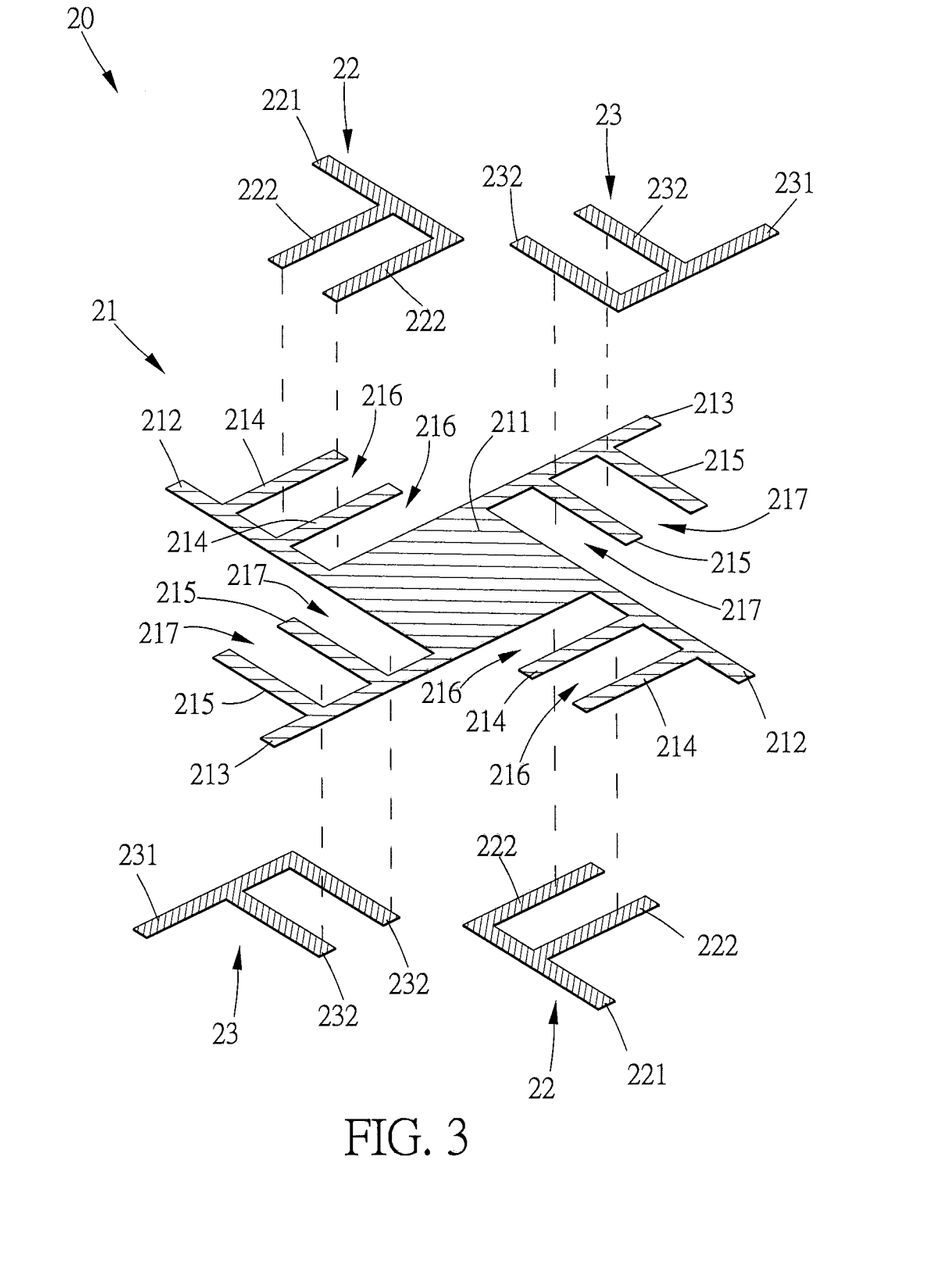
FIG. 3 illustrates an exploded drawing of the first sensing unit in one embodiment of the present invention.
Figure 4:
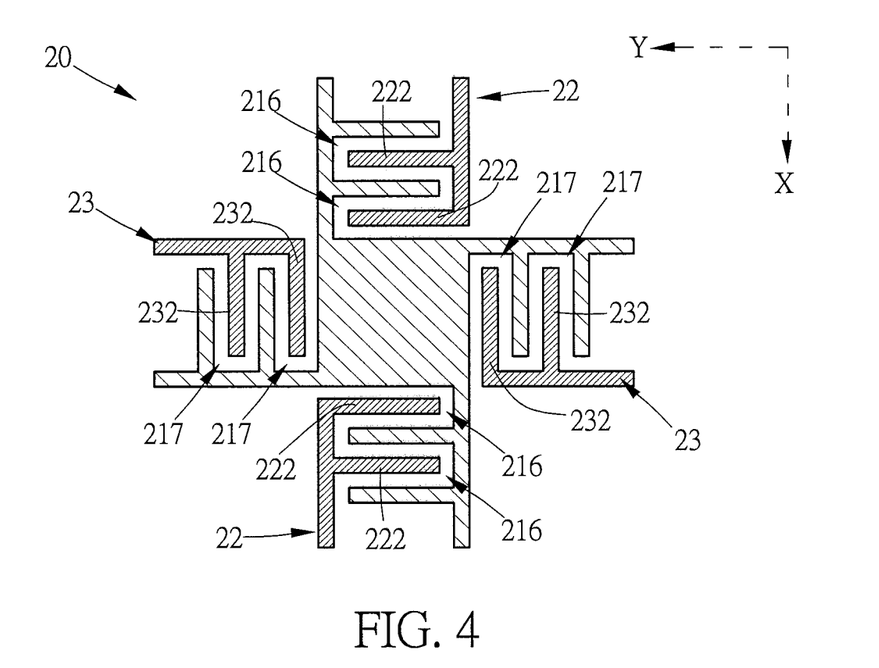
FIG. 4 illustrates a top view of the first sensing unit in one embodiment of the present invention.
Figure 5:
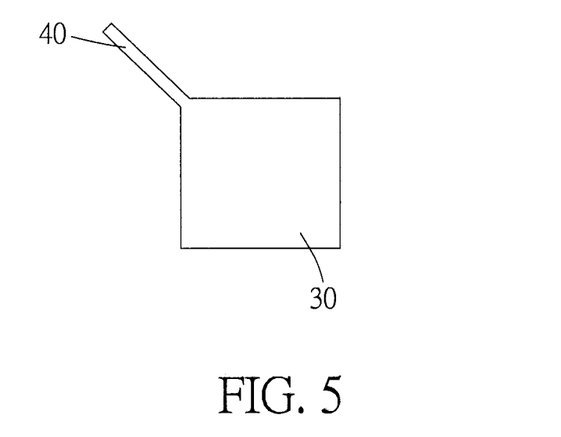
FIG. 5 illustrates a schematic drawing of the second sensing unit and the electrode column in one embodiment of the present invention.
Figure 6:
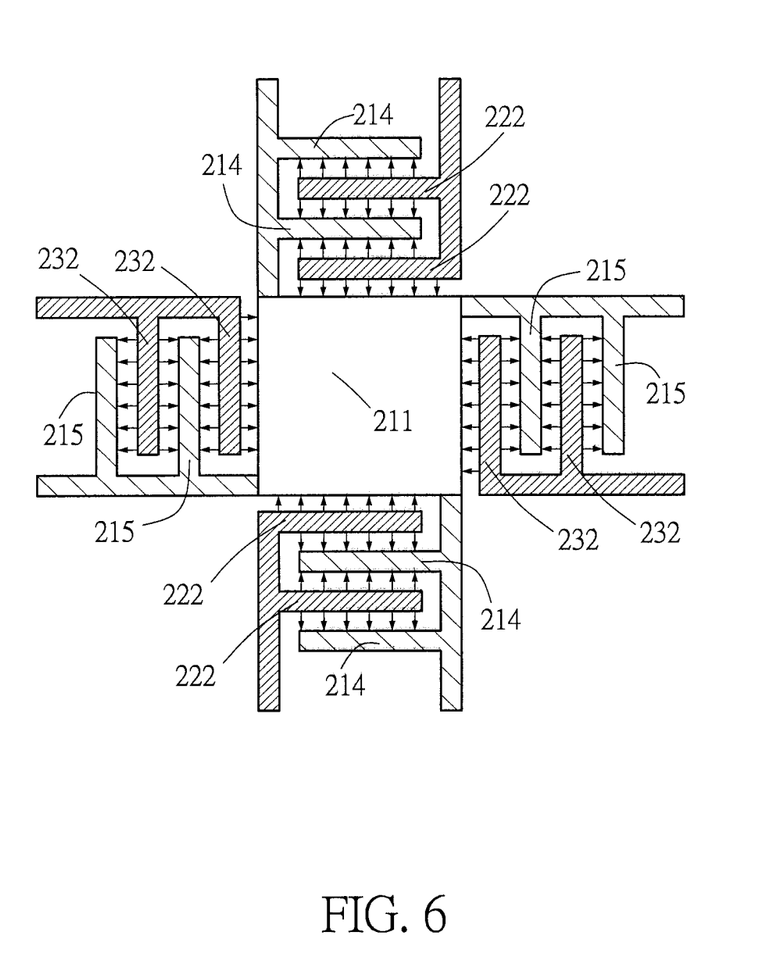
FIG. 6 illustrates a schematic drawing of the first sensing unit of the first sensing unit when forming the polarization in one embodiment of the present invention.
Figure 7:
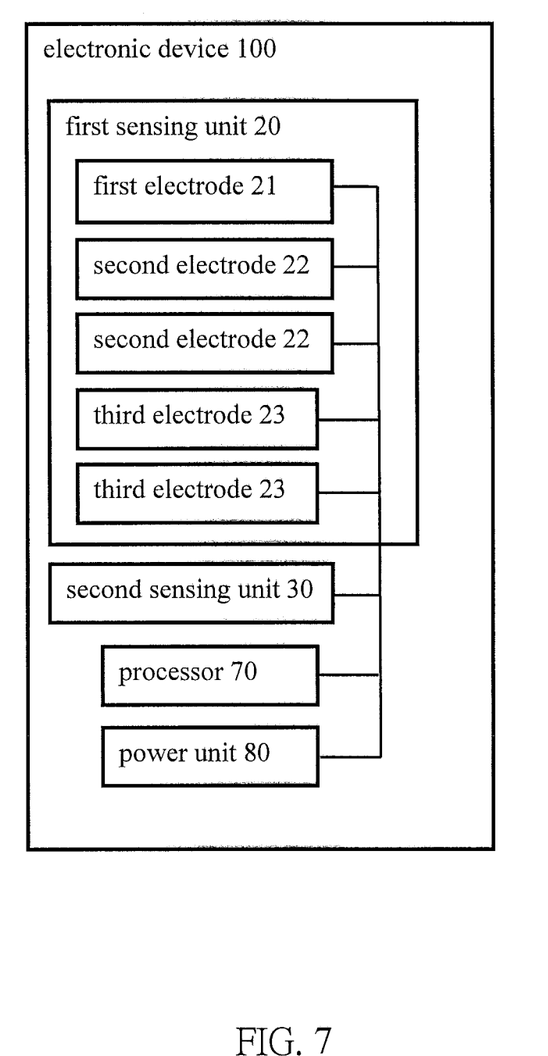
FIG. 7 illustrates a system structure drawing of the electronic device in one embodiment of the present invention.

Please refer to FIG. 1 to FIG. 7 regarding the electronic device and the triple-axial force measurement sensor in one embodiment of the present invention. FIG. 1 illustrates a schematic drawing of the triple-axial force measurement sensor in one embodiment of the present invention. FIG. 2 illustrates an exploded drawing of the triple-axial force measurement sensor in one embodiment of the present invention. FIG. 3 illustrates an exploded drawing of the first sensing unit in one embodiment of the present invention. FIG. 4 illustrates a top view of the first sensing unit in one embodiment of the present invention. FIG. 5 illustrates a schematic drawing of the second sensing unit and the electrode column in one embodiment of the present invention. FIG. 6 illustrates a schematic drawing of the first sensing unit of the first sensing unit when forming the polarization in one embodiment of the present invention. FIG. 7 illustrates a system structure drawing of the electronic device in one embodiment of the present invention.

As shown in FIG. 1, FIG. 2 and FIG. 7, in one embodiment of the present invention, the electronic device 100 is a device with the touch function, such as a smartphone, an electronic signature board, an electronic handwriting board or a tablet computer, but the type of the electronic device 100 is not limited to that design. The electronic device 100 includes a processor 70, a power unit 80 and a triple-axial force measurement sensor 1. The processor 70 is a central processing unit (CPU), and the processor 70 is electrically connected to the power unit 80 and the triple-axial force measurement sensor 1. The processor 70 is used for controlling the electronic units in the electronic device 100; the processor 70 can also receive and process the electronic signal sent by the triple-axial force measurement sensor 1, and control other electronic units to execute corresponding actions according to the electronic signal. The power unit 80 is a battery for providing power to the processor 70.

In one embodiment of the present invention, the triple-axial force measurement sensor 1 is used for sensing changes in stress along the directions of three axes (i.e., the X axis, Y axis, and Z axis), and for sending a corresponding electronic signal to the processor 70 according to the changes in stress along the directions of the three axes, allowing the processor 70 to execute the corresponding software according to the electronic signal. The triple-axial force measurement sensor 1 includes a first sensing unit 20, a second sensing unit 30, an electrode column 40, a first protection board 50 and a second protection board 60.

As shown in FIG. 2 to FIG. 4, FIG. 6 and FIG. 7, in one embodiment of the present invention, the first sensing unit 20 is made of piezoelectric material, such as polyvinylidene difluoride (PVDF), for sensing changes in stress along the directions of the X axis and Y axis, or coordinating with the second sensing unit 30 to sense changes in stress along the direction of the Z axis. The first sensing unit 20 includes a first electrode 21, two second electrodes 22 and two third electrodes 23. The first electrode 21 is electrically connected to the processor 70. The first electrode 21 includes an electrode main body 211, two first extension columns 212, two second extension columns 213, four first electrode columns 214 and four second electrode columns 215; however, the amount of the first extension columns 212, the second extension columns 213, the first electrode columns 214 and the second electrode columns 215 are not limited to the abovementioned design; the amount can be changed according to design requirements. The electrode main body 211 is used for coordinating with the surrounding second electrodes 22 and third electrodes 23 to sense changes in stress along the directions of the X axis and Y axis, and for coordinating with the second sensing unit 30 to sense changes in stress along the direction of the Z axis. Two first extension columns 212 extend along the X axis and respectively connect to the two sides of the electrode main body 211 along the X axis. The two second extension columns 213 extend along the Y axis and respectively connect to the two sides of the electrode main body 211 along the Y axis.

In one embodiment of the present invention, in the four first electrode columns 214, two first electrode columns 214 are vertically connected to one of the first extension columns 212, and the other two first electrode columns 214 are vertically connected to the other first extension column 212. The four first electrode columns 214 are parallel to each other; two of the four first electrode columns 214 are located on one side of the electrode main body 211, and the other two are located on the other side of the electrode main body 211. A first containing space 216 is formed between any two neighboring first electrode columns 214; another first containing space 216 is also formed between any one first electrode column 214 and the adjacent the electrode main body 211; whereby, the two first electrode columns 214 located on one side of the electrode main body 211 can coordinate with the electrode main body 211 to form two first containing spaces 216; the other two first electrode columns 214 located on the other side of the electrode main body 211 can also coordinate with the electrode main body 211 to form the other two first containing spaces 216. In the four second electrode columns 215, two second electrode columns 215 are vertically connected to one of the second extension columns 213, and the other two second electrode columns 215 are vertically connected to the other one of the second extension columns 213. The four second electrode columns 215 are parallel to each other; two of the four second electrode columns 215 are located on one side of the electrode main body 211, and the other two of the four second electrode columns 215 are located on the other side of the second electrode column 215. A second containing space 217 is formed between any two neighboring second electrode columns 215; another second containing space 217 is also formed between any one second electrode column 215 and the adjacent electrode main body 211; whereby, the two second electrode columns 215 located on one side of the electrode main body 211 can coordinate with the electrode main body 211 to form two second containing spaces 217; the other two second electrode columns 215 located on the other side of the electrode main body 211 can also coordinate with the electrode main body 211 to form the other two second containing spaces 217.

In one embodiment of the present invention, the two second electrodes 22 are F-shaped electrode plates which are electrically connected to the processor 70. The two second electrodes 22 are used for coordinating with the first electrode columns 214 and the electrode main bodies 211 of the first electrode 21 to form a polarization direction along the X axis. Each second electrode 22 includes a third extension column 221 and two third electrode columns 222; however, the amount of the third electrode columns 222 is not limited to the abovementioned design and can be changed according to design requirements. In each second electrode 22, two third electrode columns 222 are vertically connected to the third extension column 221. The two second electrodes 22 are respectively and correspondingly located next to the two first extension columns 212, and each third electrode column 222 is respectively located in each first containing space 216. By this design, in one embodiment of the present invention, the two third electrode columns 222 of one of the second electrodes 22 are respectively located in two first containing spaces 216 which are located on one side of the electrode main body 211, and the two third electrode columns 222 of the other second electrode 22 are respectively located in the two first containing spaces 216 which are located on the other side of the electrode main body 211. The four first electrode columns 214 and the two third electrode columns 222 of each second electrode 22 are parallel to each other. Because each first containing space 216 is formed by any two neighboring first electrode columns 214, or formed by any one first electrode column 214 and the adjacent electrode main body 211, the third electrode columns 222 in the first containing spaces 216 are located between the two neighboring first electrode columns 214, or located between the first electrode column 214 and the adjacent electrode main body 211; whereby, the four first electrode columns 214, the two third electrode columns 222 of each second electrode 22 and the electrode main body 211 are parallel and arranged staggeredly.

In one embodiment of the present invention, the two third electrodes 23 are F-shaped electrode boards which are electrically connected to the processor 70. The two third electrodes 23 are used for coordinating with the second electrode columns 215 and the electrode main bodies 211 of the first electrode 21 to form a polarization direction along the Y axis. Each third electrode 23 includes a fourth extension column 231 and two fourth electrode columns 232; however, the amount of the fourth electrode columns 232 is not limited to two and can be changed according to design requirements. In each third electrode 23, the two fourth electrode columns 232 are vertically connected to the fourth extension column 231. The two third electrodes 23 are respectively and correspondingly located next to the two second extension columns 213, and each fourth electrode column 232 is respective located in each second containing space 217. By this design, in one embodiment of the present invention, the two fourth electrode columns 232 of one of the third electrodes 23 are respectively located in the two second containing spaces 217 which are located on one side of the electrode main body 211, and the two fourth electrode columns 232 of the other third electrode 23 are respectively located in the two second containing spaces 217 which are located on the other side of the electrode main body 211. The four second electrode columns 215 and the two fourth electrode columns 232 of each third electrode 23 are parallel to each other. Because each second containing space 217 is formed by any two neighboring second electrode columns 215, or formed by any one second electrode column 215 and the adjacent electrode main body 211, the fourth electrode columns 232 in the second containing spaces 217 are located between the two neighboring second electrode columns 215, or located between the second electrode column 215 and the adjacent electrode main body 211; whereby, the four second electrode columns 215, the two fourth electrode columns 232 of each third electrode 23 and the electrode main body 211 are parallel and arranged staggeredly.

In one embodiment of the present invention, the second sensing unit 30 is made of piezoelectric material, such as polyvinylidene difluoride, for sensing changes in stress along the direction of the Z axis. The second sensing unit 30 is electrically connected to the processor 70 and located under the electrode main body 211 of the first sensing unit 20. The second sensing unit 30 is used for corresponding to the electrode main body 211 to form a polarization direction along the Z axis.

In one embodiment of the present invention, via the parallel and staggered arrangement of the abovementioned four first electrode columns 214, the two third electrode columns 222 of each second electrode 22 and the two electrode main bodies 211, the four first electrode column 214 can be corresponded to the two third electrode columns 222 of each second electrode 22 and the electrode main body 211 to form the polarization direction along the X axis. The first electrode columns 214 and the third electrode columns 222 which are arranged staggeredly can be corresponded to the neighboring electrode column or the electrode main body 211 (as shown in FIG. 4 and FIG. 6) to generate a dense induction electric field along the X axis; therefore, the stress sensing effect of the X axis can be enhanced greatly. Besides, via the parallel and staggered arrangement of the abovementioned four second electrode columns 215, the two fourth electrode columns 232 of each third electrode 23 and the electrode main body 211, the four second electrode columns 215 can be corresponded to the two fourth electrode columns 232 of each third electrode 23 and the electrode main body 211 to form the polarization direction along the Y axis. The second electrode columns 215 and the fourth electrode columns 232 which are arranged staggeredly can be corresponded to the neighboring electrode column or the electrode main body 211 (as shown in FIG. 4 and FIG. 6) to generate a dense induction electric field along the Y axis; therefore, the stress sensing effect of the Y axis can be enhanced greatly. Besides, the second sensing unit 30 can be corresponded to the electrode main body 211 to form a polarization direction along the Z axis.

As shown in FIG. 2, FIG. 5 and FIG. 7, in one embodiment of the present invention, the electrode column 40 is connected to the second sensing unit 30. The electrode column 40 can guide the excess electricity from the inside of the triple-axial force measurement sensor 1 to the outside to prevent excess energy from causing damage to the electronic units in the triple-axial force measurement sensor 1. The first protection board 50 and the second protection board 60 are hard texture plates. The first sensing unit 20 and the second sensing unit 30 are located between the first protection board 50 and the second protection board 60; whereby, the first protection board 50 and the second protection board 60 can protect the first sensing unit 20 and the second sensing unit 30 to prevent an external force from causing damage to the first sensing unit 20 and the second sensing unit 30. Besides, the structure of the triple-axial force measurement sensor 1 of the present invention is formed by laminating the first sensing unit 20, the second sensing unit 30, the first protection board 50 and the second protection board 60, and the whole height of the triple-axial force measurement sensor 1 is very low, such that the object of being small and thin can be achieved.

As shown in FIG. 1 to FIG. 4 and FIG. 7, in one embodiment of the present invention, when the triple-axial force measurement sensor 1 is deformed by an external force, the first sensing unit 20 will also be deformed by the external force; at this moment, via the piezoelectric effect, the first sensing unit 20 will generate the electronic signal, and the first sensing unit 20 will transfer the electronic signal which is generated due to the deformation to the processor 70, allowing the processor 70 to receive and analyze the electronic signal to determine the change in the stress and its direction in the three-dimensional space. Because the positive piezoelectric function is already disclosed in the prior art, there is no need for further description. It is to be known that, if external force applied to the triple-axial force measurement sensor 1 along the X axis or the Y axis deforms the first sensing unit 20, then because the staggered first electrode columns 214 and third electrode columns 222 are corresponded to the neighboring electrode column or electrode main body 211 to generate the dense induction electric field of the X axis, and the staggered second electrode columns 215 and fourth electrode columns 232 are also corresponded to the neighboring electrode column or electrode main body 211 to generate the dense induction electric field along the Y axis, the triple-axial force measurement sensor 1 has a great stress sensing ability along the X axis and the Y axis, such that the triple-axial force measurement sensor 1 can sensitively sense the external force which is applied along the X axis or Y axis.

Via the design of the electronic device 100 and the triple-axial force measurement sensor 1 of the present invention, the triple-axial force measurement sensor 1 can sensitively sense the external force which is applied along the X axis or Y axis. According to experimental data, the stress sensing abilities of the X axis and Y axis of the triple-axial force measurement sensor 1 of the present invention are equal to the stress sensing ability of the Z axis of the triple-axial force measurement sensor 1. Therefore, the electronic device and the triple-axial force measurement sensor 1 of the present invention can be used for sensing changes in stress of the surrounding area.

In summary, regardless of the purposes, means and effectiveness, this invention is quite different from the known technology and should merit the issuing of a new patent. However, it is noted that many of the above-mentioned embodiments are only for illustrative purposes; the claims of the invention should depend on the claims and not be limited to the embodiments.

What is claimed is:
1. A triple-axial force measurement sensor, comprising:
a first sensing unit, comprising:
a first electrode, comprising:
an electrode main body;
a plurality of first extension columns, connected to the electrode main body;
a plurality of second extension columns, connected to the electrode main body;
a plurality of first electrode columns, connected to the plurality of first extension columns, wherein a plurality of first containing spaces are formed between any two neighboring first electrode columns, and formed between any one first electrode column and an adjacent electrode main body; and
a plurality of second electrode columns, connected to the plurality of second extension columns, wherein a plurality of second containing spaces are formed between any two neighboring second electrode columns, and formed between any one second electrode column and an adjacent electrode main body; and
a plurality of second electrodes, each second electrode comprising:
a third extension column; and
a plurality of third electrode columns, connected to the third extension column, wherein the plurality of third electrode columns are respectively located in each first containing space; and
a plurality of third electrodes, each third electrode comprising:
a fourth extension column;
a plurality of fourth electrode columns, connected to the fourth extension column, wherein the plurality of fourth electrode columns are respectively located in each second containing space; and
a second sensing unit, located under the first sensing unit.
2. The triple-axial force measurement sensor as claimed in claim 1, wherein the plurality of third electrode columns are respectively corresponded to the plurality of surrounding first electrode columns and the electrode main body to form a polarization direction along the X axis; the plurality of fourth electrode columns are respectively corresponded to the plurality of surrounding second electrode columns and the electrode main body to form a polarization direction along the Y axis.

3. The triple-axial force measurement sensor as claimed in claim 2, wherein the electrode main body is corresponded to the second sensing unit to form a polarization direction along the Z axis.

4. The triple-axial force measurement sensor as claimed in claim 3, wherein when the first sensing unit is deformed by an external force, the first sensing unit will transfer an electronic signal which is generated due to the deformation of the first sensing unit.

5. The triple-axial force measurement sensor as claimed in claim 4, wherein the plurality of first electrode columns and the plurality of third electrode columns are parallel to each other.

6. The triple-axial force measurement sensor as claimed in claim 5, wherein the plurality of second electrode columns and the plurality of fourth electrode columns are parallel to each other.

7. The triple-axial force measurement sensor as claimed in claim 6, wherein the plurality of first electrode columns are vertically connected to the plurality of first extension columns, and the plurality of third electrode columns are vertically connected to the third extension column of the plurality of second electrodes.

8. The triple-axial force measurement sensor as claimed in claim 7, wherein the plurality of second electrode columns are vertically connected to the plurality of second extension columns, and the plurality of fourth electrode columns are vertically connected to the fourth extension column of the plurality of third electrodes.

9. The triple-axial force measurement sensor as claimed in claim 8, further comprising an electrode column, and the electrode column is connected to the second sensing unit.

10. The triple-axial force measurement sensor as claimed in claim 9, further comprising a first protection board and a second protection board, and the first sensing unit and the second sensing unit are located between the first protection board and the second protection board.

11. An electronic device, comprising:
a processor;
a power unit, electrically connected to the processor; and
a triple-axial force measurement sensor, electrically connected to the processor, the triple-axial force measurement sensor comprising:
a first sensing unit, comprising:
a first electrode, electrically connected to the processor, the first electrode comprising:
an electrode main body;
a plurality of first extension columns, connected to the electrode main body;
a plurality of second extension columns, connected to the electrode main body;
a plurality of first electrode columns, connected to the plurality of first extension columns, wherein a plurality of first containing spaces are formed between any two neighboring first electrode columns, and formed between any one first electrode column and an adjacent electrode main body; and
a plurality of second electrode columns, connected to the plurality of second extension columns, wherein a plurality of second containing spaces are formed between any two neighboring second electrode columns, and formed between any one second electrode column and an adjacent electrode main body; and
a plurality of second electrodes, electrically connected to the processor, each second electrode comprising:
a third extension column; and
a plurality of third electrode columns, connected to the third extension column, wherein the plurality of third electrode columns are respectively located in each first containing space; and
a plurality of third electrodes, electrically connected to the processor, each third electrode comprising:
a fourth extension column;
a plurality of fourth electrode columns, connected to the fourth extension column, wherein the plurality of fourth electrode columns are respectively located in each second containing space; and
a second sensing unit, electrically connected to the processor, and located under the first sensing unit.

12. The electronic device as claimed in claim 11, wherein the plurality of third electrode columns are respectively corresponded to the plurality of surrounding first electrode columns and the electrode main body to form a polarization direction along the X axis; the plurality of fourth electrode columns are respectively corresponded to the plurality of surrounding second electrode columns and the electrode main body to form a polarization direction along the Y axis.

13. The electronic device as claimed in claim 12, wherein the electrode main body is corresponded to the second sensing unit to form a polarization direction along the Z axis.

14. The electronic device as claimed in claim 13, wherein when the first sensing unit is deformed by an external force, the first sensing unit will transfer an electronic signal to the processor, wherein the electronic signal is generated due to the deformation of the first sensing unit.

15. The electronic device as claimed in claim 14, wherein the plurality of first electrode columns and the plurality of third electrode columns are parallel to each other.

16. The electronic device as claimed in claim 15, wherein the plurality of second electrode columns and the plurality of fourth electrode columns are parallel to each other.

17. The electronic device as claimed in claim 16, wherein the plurality of first electrode columns are vertically connected to the plurality of first extension columns, and the plurality of third electrode columns are vertically connected to the third extension column of the plurality of second electrodes.

18. The electronic device as claimed in claim 17, wherein the plurality of second electrode columns are vertically connected to the plurality of second extension columns, and the plurality of fourth electrode columns are vertically connected to the fourth extension column of the plurality of third electrodes.

19. The electronic device as claimed in claim 18, wherein the triple-axial force measurement sensor further comprises an electrode column, and the electrode column is connected to the second sensing unit.

20. The electronic device as claimed in claim 19, wherein the triple-axial force measurement sensor further comprises a first protection board and a second protection board, and the first sensing unit and the second sensing unit are located between the first protection board and the second protection board.

* * * * *